United States Patent [19]
Wesolowski

[11] 3,878,415
[45] Apr. 15, 1975

[54] WINDING FOR ROTARY ELECTRICAL DEVICE AND METHOD OF MAKING

[75] Inventor: Adolph J. Wesolowski, Dayton, Ohio

[73] Assignee: Dyna Corporation, Dayton, Ohio

[22] Filed: July 19, 1973

[21] Appl. No.: 380,660

[52] U.S. Cl. ................................. 310/184
[51] Int. Cl. ............................. H02k 3/00
[58] Field of Search .......... 310/179, 180, 181, 184, 310/195, 198, 203–208, 185, 202, 254, 258, 310/259

[56] References Cited
UNITED STATES PATENTS

| | | | |
|---|---|---|---|
| 3,038,093 | 6/1962 | Needham | 310/179 |
| 3,408,517 | 10/1969 | Willyoung | 310/206 |
| 3,413,717 | 12/1968 | Peters | 310/184 |
| 3,439,205 | 4/1969 | Houtman | 310/180 |
| 3,444,406 | 5/1969 | Aha | 310/195 |
| 3,470,409 | 9/1969 | Scheda | 310/180 |
| 3,535,572 | 10/1970 | De Rugeris | 310/207 |
| 3,600,619 | 8/1971 | Tiarks | 310/206 |
| 3,633,057 | 1/1972 | Smith | 310/184 |

*Primary Examiner*—R. Skudy
*Attorney, Agent, or Firm*—Melvin A. Crosby

[57] ABSTRACT

A rotary electrical device, such as a motor, has an iron member with a circular array of axial slots to receive a winding. The winding is applied in the form of identical coil means distributed about the array of slots with each coil means overlapping the coil means at each side thereof. Each coil means may comprise two or more consecutively wound identical coils each displaced one slot from the others. A terminal is taken from each end of each coil means. The number of slots in the array of slots is so selected that every slot has a single coil side only therein.

5 Claims, 3 Drawing Figures

3,878,415

PATENTED APR 15 1975

WINDING FOR ROTARY ELECTRICAL DEVICE AND METHOD OF MAKING

The present invention relates to electrical apparatus, particularly rotating electrical apparatus, and is especially concerned with a winding for such an apparatus and a method of applying the winding.

Rotating electrical apparatus, such as generators and motors, employ at least one wound member, usually the stator, with the wound member comprising soft iron, usually in the form of stacked laminations, and having axial slots therein in which the windings are placed. For the purpose of the present application, it will be considered that the wound member is a stator although it will be understood that the winding could be applied to the rotary position of the apparatus as well as to the stationary portion thereof.

A typical stator has a circular array of slots therein in which the winding for the apparatus is placed. There are many different procedures for applying the windings and, in the case of polyphase apparatus, the windings are distributed on the stator.

Problems are often encountered in respect of winding stators of the nature referred to because the winding pattern often results in two coil sides being disposed in a single slot of the stator, or in some of the slots being left open, thereby resulting in an inefficient use of the iron or an inefficient use of the wire of the winding. Furthermore, some winding patterns tend to become rather complex and, when the windings are manually applied, errors can occur in the winding process.

Having the foregoing in mind, a primary objective of the present invention is the provision of a winding for rotating electrical apparatus and a method of applying the winding which is substantially improved over what has been known in the prior art.

Another object of the present invention is the provision of a winding for rotating electrical apparatus and a method of applying the winding in which efficient use is made of the iron to which the winding is applied and of the wire making up the winding.

A still further object of the present invention is the provision of a winding for rotating electrical apparatus and a method of applying the winding to the apparatus in which the winding operation is quite simple.

BRIEF SUMMARY OF THE INVENTION

According to the present invention the winding for a slotted soft iron member for rotating electrical equipment is so designed and applied that every slot of the member has one single coil side only therein. The winding is made up of distributed coil means, with the number of coil means on the member being determined by the number of magnetic poles established in the member by the winding and by the number of phases of the polyphase electrical system in which the apparatus is to be employed. Most polyphase systems are three phase and, with this in mind, the present invention is described in respect of a three phase system.

Each coil means of the wound member can be made up of individual coils which are advantageously consecutively wound with each coil being identical to all the other coils and displaced one slot from the other coils making up a respective coil means. The winding of the slotted member proceeds around the slotted member in one direction with a terminal being taken from the opposite ends of each of the coil means. When the slotted member is completely wound every slot contains one single coil side only.

The objects referred to above as well as still other objects and advantages of the present invention will become more apparent upon reference to the following detailed specification taken in connection with the accompanying drawings in which:

FIG. 1 schematically shows a typical piece of electrical apparatus into which the invention is applicable.

FIG. 2 schematically illustrates the manner in which the present invention can be applied to a 24 slot stator for a three phase-four pole electric motor.

FIG. 3 is a view similar to FIG. 2 but showing the manner in which the invention is applied to a 36 slot stator.

DETAILED DESCRIPTION OF THE INVENTION

Figure 1:
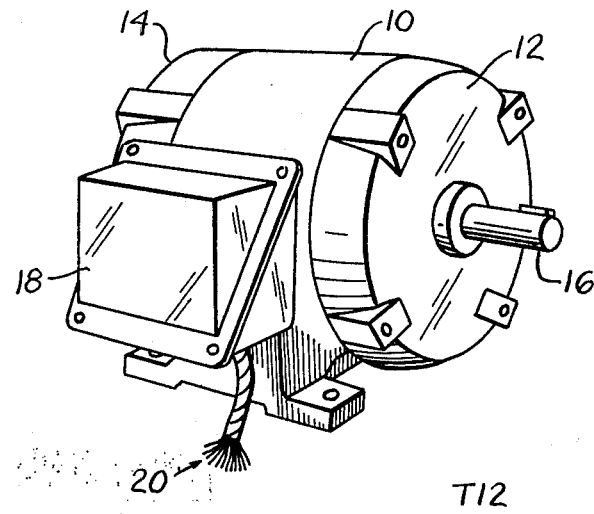

The motor of FIG. 1, and which is illustrated as exemplary of the type of rotating electrical apparatus with which the present invention is practiced, comprises a frame 10 with end covers 12 and 14. The shaft 16 takes a bearing on the end covers and, internally of the motor, has mounted thereon a rotor. The rotor, or armature, rotates inside a stator mounted in frame 10 and this stator is slotted and carries the winding according to the present invention. The frame has a box 18 mounted thereon and extending into the box are the leads 20 which, in respect of a four pole-three phase motor would amount to 12 leads.

Figure 2:
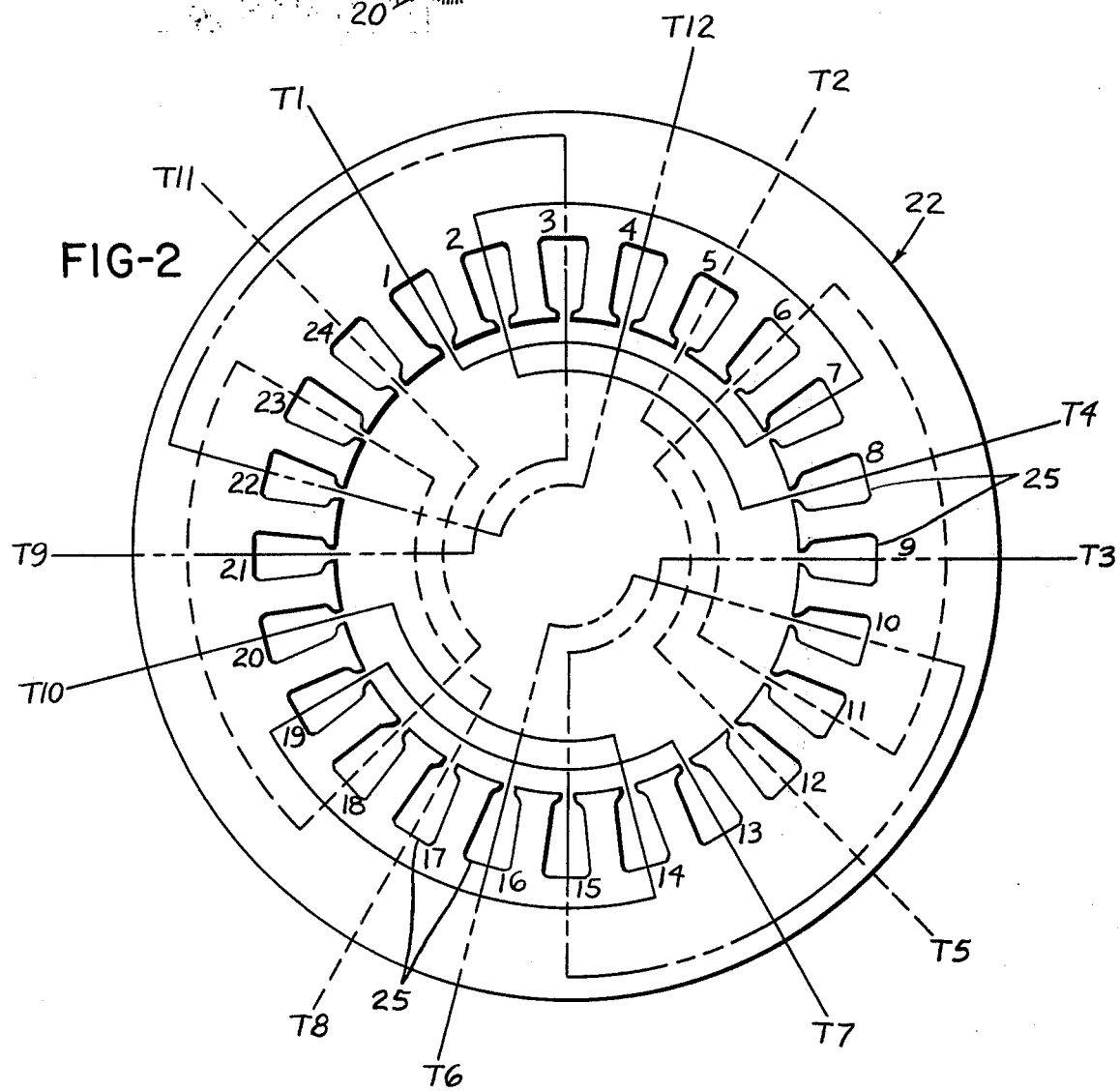

Turning now to FIG. 2, the stator of the motor in FIG. 1 is schematically illustrated and is generally designated 22. The stator comprises a stack of laminations cut and arranged and interconnected in a conventional manner and is provided with a circular array of uniformly circumferentially spaced slots 25 in which the winding according to the present invention is placed. The slot disposition and configuration can be substantially conventional.

According to the present invention the winding is applied to stator 22 in such a manner that each slot 25 contains one single coil side only thereby simplifying the winding of the stator, eliminating regions of high electrical stress which can occur between two coil sides when both are disposed in one slot, and also making highly efficient use of the iron and the wire from which the winding is made.

The slots in FIG. 2 are numbered from 1 to 24. The number of slots is determined in conformity with the number of magnetic poles established by energization of the winding and by the number of phases of the polyphase system with which the apparatus is used. The minimum number of coil means that can be used for winding a stator of the nature illustrated is three halves times the number of poles or, namely, six coil means. Each of the coil means has two sides so that the minimum number of slots that can be provided and wound so that only a single coil side is disposed in each slot is 12 slots. In the present case each coil means of the winding is made up of two individual coils each having two sides and each of the coil sides being in a respective slot so that each coil means occupies four slots, making 24 slots in all, as illustrated.

In FIG. 2 the first coil means applied has terminals identified at T1 and T4 and is wound by winding a first coil in slots 1 and 7 and thereafter winding an identical coil in slots 2 and 8. It will be understood that each coil has coil sides disposed in respective slots and coil ends extending between the slots at the opposite ends of the member being wound.

After the coils making up the coil means having the terminals T1 and T4 applied, an identical winding operation is carried out commencing with terminal T2 and winding a coil in slots 5 and 11 followed by a coil wound in slots 6 and 12 and with terminal T5 being taken off from the finishing end of the second wound coil from slot 12.

The next coil means wound consists in the coil commencing with terminal T3 and wound in slots 9 and 15 and the coil finishing with terminal T6 and wound in slots 10 and 16.

Thereafter, the coils are wound on the stator which commence with terminal T7 representing the beginning end of a coil wound in slots 13 and 19 and end with terminal T10 representing the finishing end of a coil wound in the slots 14 and 20.

The coils having terminals T8 and T11 are then wound, and finally, the coils having the terminals T9 and T12 are then wound. All of the coil means are identical and are uniformly spaced about the stator and each of the coils making up each coil means is identical to the others with the individual coils of each coil means being spaced apart one slot space.

It will be apparent that each and every slot of the member 22 is wound and each slot contains a single coil side only.

It will be understood that the usual practices with regard to the introduction of insulation between the winding and the slot sides as followed as well as the closing of the radially inner open sides of the slots and the dipping of the completely wound stator into an insulating and protective coating material.

Inasmuch as each coil means is directly opposed to an identical coil means, for example the coil means having the terminals T1 and T4 is directly opposed to the coil means having the terminals T7 and T10, the opposed coil means can be serially connected for a higher voltage or connected in parallel for a lower voltage.

For the sake of clarity the directly opposed and, therefore, corresponding windings, are designated with different type lines.

The coil means having terminals T1 and T4 and the coil means having the terminals T7 and T10 are illustrated in solid lines while the coil means having the terminals T2 and T5 and terminal means T8 and T11 are shown in dashed lines, and the coil means having the terminals T3 and T6 and T9 and T12 are shown in dot dash lines.

Figure 3:
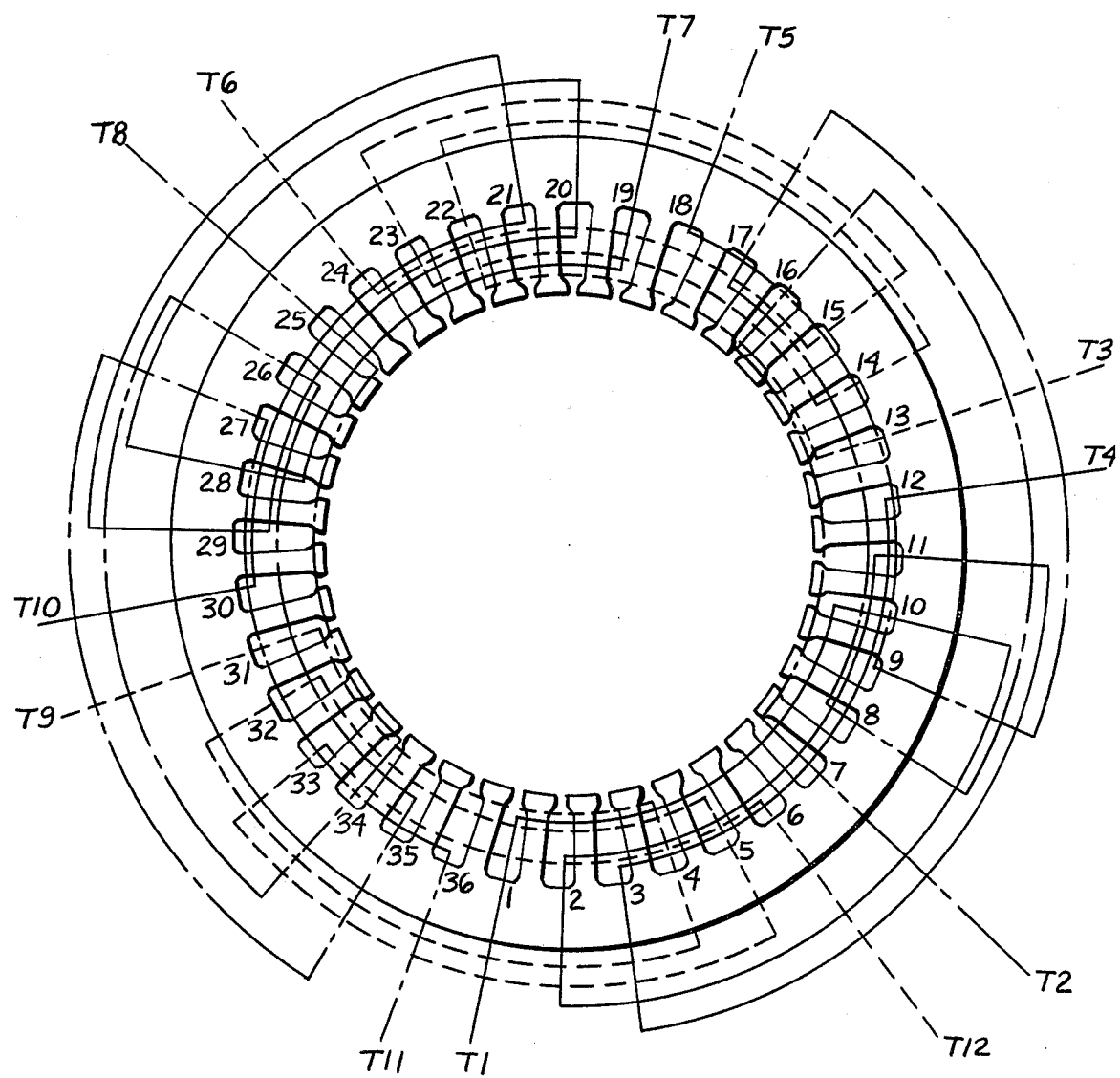

In the stator of FIG. 3, thirty-six slots are provided and the winding is applied in the same manner as has been described in connection with FIG. 2 except that each coil means consists of three individual coils so that each coil means has a total of six coil sides and takes up six slots. Thus, for the six coil means, a total of 36 slots is required in the wound member and, as in the case of the FIG. 2 modification described in detail, every slot has a single coil side only therein.

The slots in FIG. 3 are numbered from 1 to 36 and the 12 terminals of the winding means are again identified at T1 through T12. No other reference numerals are applied to the modification of FIG. 3 because it is not believed necessary for a comprehension of what is disclosed therein since it is the same as the FIG. 2 modification except for having three coils in each coil means instead of two coils in each coil means as shown in FIG. 2.

It will be apparent that the method according to the present invention could be practiced in connection with stators having a greater number of poles than illustrated. In every case the number of coil means will be three halves times the number of magnetic poles established by energization of the coil means and the number of slots required to a stator to receive the winding according to the present invention will always be the number of coil means multiplied by the number of individual coils making up each coil means and further multiplied by two because each coil has two sides.

Modifications may be made within the scope of the appended claims.

What is claimed is:

1. A polyphase winding for rotary electrical apparatus having a soft iron member with axial slots distributed circumferentially about said member; said winding comprising a plurality of coil means with coil sides in said slots and coil ends extending between said coil sides, each coil means having terminals at the opposite ends, each coil means overlapping the coil means next adjacent thereto on each side, and each slot of said member having a single coil side only therein, the number of slots in the member being a whole number times the product of the number of magnetic poles of the apparatus and the number of phases.

2. A polyphase winding according to claim 1 in which said winding is a three phase winding and the number of slots in the member is three times the product of the number of magnetic poles of the apparatus and the number of coils in each coil means, each coil means comprising a plurality of coils all of the same size and offset one slot from one another.

3. A polyphase winding according to claim 1 in which said rotary electrical apparatus is a three phase-four pole machine and said coil means comprises six coil means in uniformly distributed relation in the slots of the said iron member.

4. A polyphase winding according to claim 1 in which said rotary electrical apparatus is a three phase-four pole machine, said coil means consisting of six coil means in uniformly distributed relation in the slots of the said iron member each coil means comprising two coils, and said iron member having 24 slots therein, the coil sides of one coil of a respective coil means being disposed in a pair of spaced slots and with the coil sides of the other coil of the said respective coil means being disposed in the slots which are next adjacent said pair of slots progressing in the same direction about the array of slots.

5. A polyphase winding according to claim 1 in which said rotary electrical apparatus is a three phase-four pole machine, said coil means consisting of six coil means in uniformly distributed relation in the slots of the said iron member each coil means comprising three coils, and said iron member having 36 slots therein.

* * * * *